US012719214B2

(12) United States Patent
Vergara López et al.

(10) Patent No.: US 12,719,214 B2
(45) Date of Patent: Aug. 25, 2026

(54) HIGH-VOLTAGE CONNECTOR FOR THREE-PHASE ELECTRICAL MACHINE

(71) Applicant: Schaeffler Technologies AG & Co. KG, Herzogenaurach (DE)

(72) Inventors: Mauricio Vergara López, San Pedro Cholula (MX); Antonio Cortés Ramírez, Puebla (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 348 days.

(21) Appl. No.: 18/524,926

(22) Filed: Nov. 30, 2023

(65) Prior Publication Data

US 2025/0183590 A1 Jun. 5, 2025

(51) Int. Cl.

*H01R 13/639* (2006.01)
*H01R 13/627* (2006.01)
*H01R 13/631* (2006.01)

(52) U.S. Cl.

CPC ......... *H01R 13/639* (2013.01); *H01R 13/627* (2013.01); *H01R 13/631* (2013.01)

(58) Field of Classification Search

CPC .... H01R 13/20; H01R 13/639; H01R 13/627; H01R 13/631
USPC ......................................... 439/346, 347, 133
See application file for complete search history.

(56) References Cited

U.S. PATENT DOCUMENTS 4,302,066 A * 11/1981 Newman ............ H01R 13/6395 439/347
4,671,594 A * 6/1987 Ohtsuki ................. H01R 24/76 439/372
4,871,323 A * 10/1989 Ohsumi ............... H01R 13/639 439/509
5,639,255 A * 6/1997 Muzslay ............ H01R 13/6277 439/347
5,692,918 A * 12/1997 Hill ........................ G01V 1/208 174/101.5
11,670,893 B2 * 6/2023 Horning ............. H01R 13/6275 439/346

FOREIGN PATENT DOCUMENTS

CN 108696058 A 10/2018

* cited by examiner

*Primary Examiner* — Gary F Paumen
(74) *Attorney, Agent, or Firm* — Suiter Swantz IP

(57) ABSTRACT

A joining clip for securing a plug and socket of an electrical connector of an electrical machine is described. The joining clip exerts pressure on a port and a socket of an electrical connector, preventing the port and socket from uncoupling. The port and socket may define recesses which conform to and receive the joining clip. The joining clip may be inserted in the recesses thereby joining the port and socket. The joining clip provides a threadless means for joining the port and socket, providing ease-of-assembly when coupling and uncoupling the electrical connector.

20 Claims, 10 Drawing Sheets

100

HIGH-VOLTAGE CONNECTOR FOR THREE-PHASE ELECTRICAL MACHINE

TECHNICAL FIELD

The present invention generally relates to electrical connections between conductive members, and, more particularly, to electrical connections secured by a spring, clip, or other resilient member.

BACKGROUND

High-voltage electrical connections are used in several three-phase electric machines. The high-voltage electrical connections in the three-phase electric machines typically use a threaded connection. The threaded connection ensures the connection is maintained when subject to vibrations. However, the threaded connection undesirably requires the use of tooling during assembly and disassembly. Therefore, it would be advantageous to provide a device, system, and method that cures the shortcomings described above.

SUMMARY

A joining clip for securing a plug and socket of an electrical connector of an electrical machine is described, in accordance with one or more embodiments of the present disclosure. The joining clip comprises a first end and a second end. The first end is oriented in an opposing direction to the second end. The joining clip comprises a first leg and a second leg. The joining clip comprises a U-bend. The U-bend joins the first leg to the second leg. The joining clip comprises a first L-bend and a second L-bend. The first L-bend joins the first end to the first leg. The second L-bend joins the second end to the second leg. The joining clip is configured to secure the plug to the socket when the plug is inserted in the socket.

In embodiments, the joining clip comprises a wire. The first end and the second end are disposed at opposing ends of the wire.

In embodiments, the first end, the second end, the first leg, and the second leg are straight.

In embodiments, the first leg and the second leg each include a same length. The first end and the second end are co-planar.

In embodiments, the first leg, the second leg, and the U-bend are co-planar.

In embodiments, the first leg and the second leg are longer than the first end and the second end.

In embodiments, the first end and the second end are joined at approximately 90-degrees with the first leg and the second leg. The first leg is joined at approximately 180-degrees with the second leg.

In embodiments, the plug comprises a cable housing defining a cable housing recess. The socket comprises a terminal housing defining a first terminal housing recess and a second terminal housing recess. The joining clip is configured to secure the plug to the socket by being received in the cable housing recess, the first terminal housing recess, and the second terminal housing recess.

An electrical connector of an electrical machine is described, in accordance with one or more embodiments of the present disclosure. The electrical connector comprises a first joining clip. The first joining clip comprises a first end and a second end. The first end is oriented in an opposing direction to the second end. The first joining clip comprises a first leg and a second leg. The first joining clip comprises a U-bend. The U-bend joins the first leg to the second leg. The first joining clip comprises a first L-bend and a second L-bend. The first L-bend joins the first end to the first leg. The second L-bend joins the second end to the second leg. The electrical connector comprises a first plug. The first plug comprises a cable and a cable housing. The cable housing is rigidly coupled to and supports the cable. The electrical connector comprises a first socket. The first socket comprises a terminal and a terminal housing. The terminal housing is rigidly coupled to and supports the terminal. The first plug is configured for insertion in the first socket such that the cable and the terminal are in electrical contact. The first joining clip is configured to secure the first plug to the first socket when the first plug is inserted in the first socket.

In embodiments, the cable and the terminal are each a flat metal plate.

In embodiments, the cable housing defines a cable housing recess. The terminal housing defines a first terminal housing recess and a second terminal housing recess. The joining clip is configured to secure the first plug to the first socket by being received in the cable housing recess, the first terminal housing recess, and the second terminal housing recess.

In embodiments, the cable housing recess and the first terminal housing recess are aligned when the first socket receives the first plug. The cable housing recess and the first terminal housing recess are configured to receive the first leg and the first end of the first joining clip.

In embodiments, the second terminal housing recess is configured to receive the second leg and the second end of the first joining clip.

In embodiments, the U-bend conforms to an exterior face of the terminal housing between the first terminal housing recess and the second terminal housing recess when the first joining clip is received in the cable housing recess, the first terminal housing recess, and the second terminal housing recess.

In embodiments, the first joining clip is electrically insulated from the cable and the terminal when the first joining clip secures the first plug and the first socket.

In embodiments, the electrical connector comprises a junction box and a busbar. The junction box comprises a plurality of plugs. The first plug is a first of the plurality of plugs. The busbar comprises a plurality of sockets. The first socket is a first of the plurality of sockets.

In embodiments, the plurality of plugs comprises the first plug, a second plug, and a third plug. The first plug, the second plug, and the third plug are aligned in a row. The plurality of sockets comprises the first socket, a second socket, and a third socket. The first socket, the second socket, and the third socket are aligned in a row. The second socket is configured to receive the second plug. The third socket is configured to receive the third plug.

In embodiments, the electrical connector further comprises a second joining clip. The second joining clip is configured to secure the third plug and the third socket when the third plug is received by the third socket.

In embodiments, the electrical connector is a high voltage electrical connector.

A method of securing a plug and socket of an electrical connector of an electrical machine is described, in accordance with one or more embodiments of the present disclosure. The method comprises inserting a first plug in a first socket such that a cable and a terminal are in electrical contact. The first plug comprises the cable and a cable housing. The cable housing is rigidly coupled to and supports the cable. The first socket comprises the terminal and a terminal housing. The method comprises securing the first plug to the first socket using a first joining clip. The first joining clip comprises a first end, a second end, a first leg, a second leg, a U-bend, a first L-bend, and a second L-bend. The first end is oriented in an opposing direction to the second end. The U-bend joins the first leg to the second leg. The first L-bend joins the first end to the first leg, wherein the second L-bend joins the second end to the second leg.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a joining clip for securing a plug and socket of one or more electrical connections of an electrical machine. For example, the joining clip may include a rigid metallic clip that exerts pressure on a port and a socket of an electrical connector, preventing the port and socket from uncoupling. The port and socket of the electrical connector may define recesses which conform to and receive the joining clip. The joining clip may be inserted in the recesses of the electrical connector, thereby joining the port and socket. The joining clip provides a threadless means for joining the port and socket without requiring tooling, which is desirable for ease-of-assembly when coupling and uncoupling the electrical connector.

Figure 1:
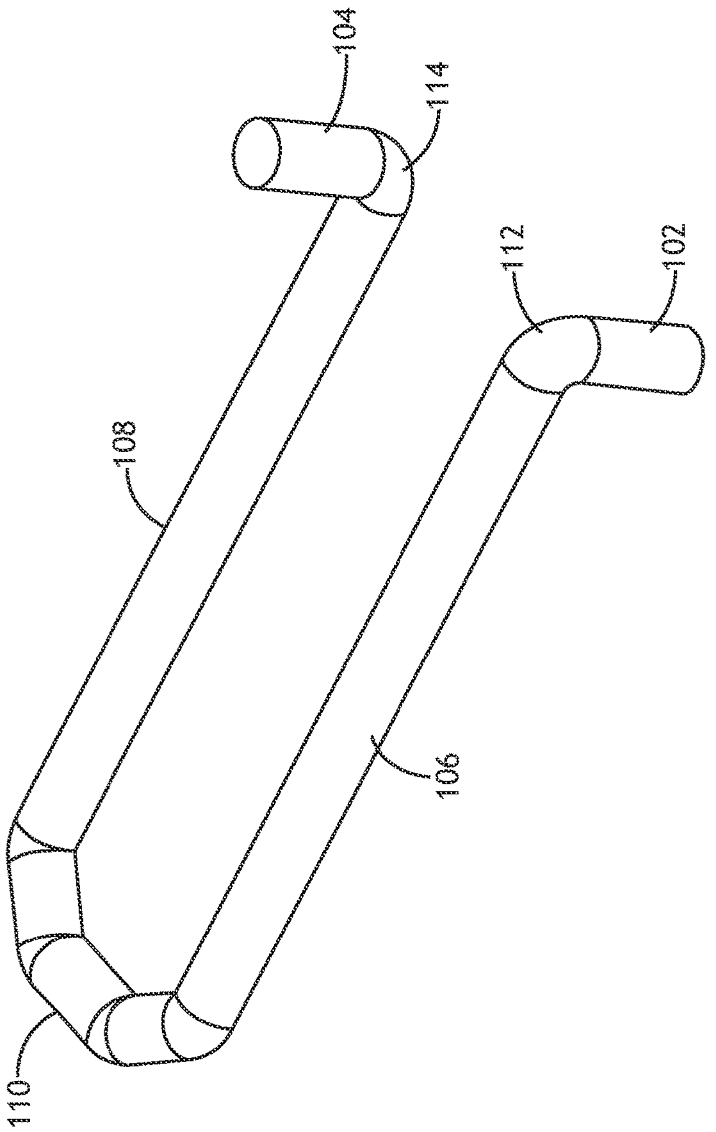
FIG. 1 depicts a perspective view of a joining clip, in accordance with one or more embodiments of the present disclosure.

FIG. 1 illustrates a schematic view of a joining clip 100, in accordance with one or more embodiments of the present disclosure. The joining clip 100 may include a first end 102, a second end 104, a first leg 106, a second leg 108, a U-bend 110, a first L-bend 112, and/or a second L-bend 114.

In embodiments, the first end 102 may be oriented in an opposing direction to the second end 104. The first end 102 and/or the second end 104 may be a vertical part of the joining clip 100. For example, the first end 102 may be oriented downwards and the second end 104 may be oriented upwards. The orientation of the first end 102 in the opposing direction to the second end 104 may prevent installation of the joining clip 100 in a wrong direction. The joining clip 100 may have 180-degree rotational symmetry about the longitudinal axis by the first end 102 being oriented in the opposing direction to the second end 104. In this regard, the joining clip 100 may be rotated 180-degrees around the longitudinal axis of the joining clip 100 such that, upon rotation, the first end 102 functions as the second end 104, and vice versa.

In embodiments, the first end 102 and/or the second end 104 may have a selected length. For example, the first end 102 and the second end 104 may each have the same length. Although the first end 102 and the second end 104 are described as having the same length, this is not intended as a limitation of the present disclosure. It is further contemplated that the first end 102 and the second end 104 may have differing lengths.

In embodiments, the first end 102 and the second end 104 may be co-planar. For example, the first end 102 and the second end 104 may be co-planar in an upright plane which is orthogonal to the longitudinal axis of the joining clip 100. Although the first end 102 and the second end 104 are described as being co-planar, this is not intended as a limitation of the present disclosure. It is further contemplated that the first end 102 and the second end 104 may be in offset planes.

In embodiments, the first leg 106 and/or the second leg 108 may have a selected length. For example, the first leg 106 and the second leg 108 may each have the same length. Although the first leg 106 and the second leg 108 are described as having the same length, this is not intended as a limitation of the present disclosure. It is further contemplated that the first leg 106 and the second leg 108 may have differing lengths. In embodiments, the first leg 106 may be longer than the first end 102. In embodiments, the second leg 108 may be longer than the second end 104. In this regard, the first leg 106 and/or the second leg 108 may be elongated portions of the joining clip 100.

In embodiments, the first leg 106 and/or the second leg 108 may be a horizontal or longitudinal part of the joining clip 100. For example, the first leg 106 and/or the second leg 108 may extend along the longitudinal axis of the joining clip 100.

The first L-bend 112 may join the first end 102 to the first leg 106. The second L-bend 114 may join the second end 104 to the second leg 108.

The first L-bend 112 and/or the second L-bend 114 may be bent with a selected angle. In embodiments, the first L-bend 112 and/or the second L-bend 114 may have a 90-degree bend. It is further contemplated that the first L-bend 112 and/or the second L-bend 114 may vary from the 90-degree bend, without exceeding the scope of the present disclosure. The first L-bend 112 and/or the second L-bend 114 may have an angle which is approximately 90-degrees.

The U-bend 110 may join the first leg 106 to the second leg 108. The first leg 106 and second leg 108 may form a channel therebetween by way of the U-bend 110. For example, the width of the channel between the first leg 106 and second leg 108 may be based on a bend radius of the U-bend 110.

The U-bend 110 may be bent with a selected angle. In embodiments, the U-bend 110 may have a 180-degree bend. It is further contemplated that the U-bend 110 may vary from the 180-degree bend, without exceeding the scope of the present disclosure. The U-bend 110 may have an angle which is approximately 180-degrees.

In embodiments, the first leg 106, the second leg 108, and/or the U-bend 110 may be co-planar. For example, the first leg 106, the second leg 108, and/or the U-bend 110 may be disposed in a horizontal plane.

In embodiments, the first end 102, the second end 104, the first leg 106, and/or the second leg 108 may be straight. For example, the first end 102, the second end 104, first leg 106, and/or the second leg 108 may be straight along the entire length of the respective elements. In this regard, the first end 102, the second end 104, first leg 106, and/or the second leg 108 may extend uniformly in one direction only, without a curve or bend.

In embodiments, the joining clip 100 is a resilient member. In this regard, the joining clip 100 may return to an original shape subsequent to being deformed. The joining clip 100 may have a selected elastic modulus sufficient to allow the joining clip to deform and then recover to the original shape. The joining clip 100 may be elastically deformed by an external force spreading the first leg 106 away from the second leg 108. Spreading the first leg 106 away from the second leg 108 may cause the bend radius of the U-bend 110 to increase. Once the external force is removed, the first leg 106 may return towards the second leg 108. The return of the first leg 106 towards the second leg 108 may cause the U-bend 110 to elastically return to the original bend radius.

In embodiments, the joining clip 100 includes a selected cross-section. For example, the joining clip 100 may include a round cross-section, a square cross-section, or an N-sided polygonal cross-section, where N is an integer. Any of the first end 102, second end 104, first leg 106, second leg 108, U-bend 110, first L-bend 112, and/or second L-bend 114 may include the selected cross-section.

In embodiments, the joining clip 100 is formed from a wire. For example, the joining clip 100 may be formed from a continuous length of wire. The wire may be bent to define the first end 102, second end 104, first leg 106, second leg 108, U-bend 110, first L-bend 112, and second L-bend 114. The first end 102 and second end 104 may be disposed at opposing ends of the wire.

The joining clip 100 may be formed from any material known in the art. For example, the material may be conductive or non-conductive. In embodiments, the joining clip 100 may be a rigid metallic element formed from metal. For example, the joining clip 100 may be formed from metallic wire. By way of another example, the joining clip 100 may be formed from a metallic wire covered in an insulating material (e.g., plastic or rubber). In embodiments, the joining clip 100 may be a rigid plastic element formed from plastic.

FIGS. 2A-2H illustrates an electrical connector 200, in accordance with one or more embodiments of the present disclosure. The connector 200 may include one or more of the joining clips 100, a junction box 202, and/or a busbar 204.

In embodiments, the junction box 202 may include one or more plugs 206 and the busbar 204 may include one or more sockets 212. The plugs 206 may be rigid elements for engagement with the sockets 212 to establish an electrical connection. Similarly, the sockets 212 may be rigid elements for receiving the plugs 206 to establish the electrical contact. Thus, the electrical connector 200 may be a coupling device having the plugs 206 and the sockets 212 which may be adapted for repeated physical engagement or disengagement for establishing and breaking the electrical connection.

In embodiments, the plugs 206 include a cable 208 and a cable housing 210. In embodiments, the sockets 212 include a terminal 214 and a terminal housing 216.

The cable 208 and/or the terminal 214 may be formed from an electrical conductor. For example, the cable 208 and/or the terminal 214 may be formed from copper, aluminum, or an alloy thereof. The cable 208 may form an electrical connection with the terminal 214 when the cable 208 contacts the terminal 214.

In embodiments, the cable 208 and the terminal 214 each include a flat metal plate. For example, the cable 208 and the terminal 214 may each have a thickness which may be much smaller than the width and length. Each of the cable 208 and the terminal 214 may define a pair of opposing faces. In embodiments, one of the pair of opposing faces includes an uncovered face and the other includes a covered face. The opposing faces may include any suitable shape, such as a rectangular shape. The cable 208 may touch the terminal 214 by the uncovered face of the cable 208 being placed in contact with the uncovered face of the terminal 214. For instance, the uncovered rectangular face of the cable 208 may be placed in contact with the uncovered rectangular face of the terminal 214 in a contact area.

The cable housing 210 may be rigidly coupled to and support the cable 208. In embodiments, the cable housing 210 may be rigidly coupled to one of the pair of opposing faces of the cable 208. The cable housing 210 may cover the covered face by rigidly coupling to the covered face. Similarly, the terminal housing 216 may be rigidly coupled to and support the terminal 214. In embodiments, the terminal housing 216 may be rigidly coupled to one of the pair of opposing faces of the terminal 214. The terminal housing 216 may cover the covered face by rigidly coupling to the covered face.

The cable housing 210 and the terminal housing 216 may be formed from an electrical insulator. For example, the cable housing 210 and the terminal housing 216 may be formed from a plastic material.

In embodiments, the sockets 212 serve as receptables for the plugs 206. The sockets 212 may define a cavity 218. The cavity 218 may be defined between the terminal housing 216 and the terminal 214. The cavity 218 may receive the plugs 206. The cable 208 may touch the terminal 214 when the cavity 218 defined by the socket 212 receives the plugs 206. Thus, the plugs 206 may be inserted in the sockets 212 such that the cable 208 and the terminal 214 may be in electrical contact. The cable 208 and terminal 214 provide an electrically-conductive connection via the contact.

In embodiments, the joining clips 100 may be configured to join or secure the junction box 202 and busbar 204. The joining clips 100 may join or secure the plugs 206 of the junction box 202 to the sockets 212 of the busbar 204 when the plugs 206 are inserted in the sockets 212. For example, the joining clip 100 may exert pressure on the plugs 206 and the sockets 212. The pressure exerted by the joining clips 100 may prevent separation of the plugs 206 from the sockets 212. In embodiments, the joining clips 100 may be a threadless joining element. In this regard, the joining clips 100 may not include a thread. In embodiments, the electrical connector 200 may be a threadless electrical connector 200. In this regard, the junction box 202 may be joined to the busbar 204 without using a threaded connection. The joining clips 100 may act as a male part of the electrical connector 200. In embodiments, the plugs 206 and sockets 212 may be connected before the joining clip 100 may be inserted.

The cable housing 210 may define a cable housing recess 220. The cable housing recess 220 may include a cable housing leg recess 222 and a cable housing end recess 224. The cable housing end recess 224 may extend from the cable housing leg recess 222. The cable housing leg recess 222 may be orthogonal to the cable housing end recess 224. The cable housing leg recess 222 may be oriented along a horizontal axis of the cable housing 210. The cable housing end recess 224 may be oriented along a vertical axis of the cable housing 210.

The terminal housing 216 may define a first terminal housing recess 226 and a second terminal housing recess 228. In embodiments, the first terminal housing recess 226 and the second terminal housing recess 228 may be disposed on opposing sides of the terminal housing 216. The second terminal housing recess 228 may be inverted to the first terminal housing recess 226. The first terminal housing recess 226 may be in a face of the terminal housing 216 opposed to a contact area between the cable 208 and the terminal 214.

The first terminal housing recess 226 may include a first terminal housing leg recess 230 and a first terminal housing end recess 232. The first terminal housing end recess 232 may extend from the first terminal housing leg recess 230. The first terminal housing leg recess 230 may be orthogonal to the first terminal housing end recess 232. The first terminal housing leg recess 230 may be oriented along a horizontal axis of the terminal housing 216. The first terminal housing end recess 232 may be oriented along a vertical axis of the terminal housing 216.

Similarly, the second terminal housing recess 228 may include a second terminal housing leg recess 234 and a second terminal housing end recess (not depicted). The second terminal housing end recess may extend from the second terminal housing leg recess 234. The second terminal housing leg recess 234 may be orthogonal to the second terminal housing end recess. The second terminal housing leg recess 234 may be oriented along a horizontal axis of the terminal housing 216. The second terminal housing end recess (not depicted) may be oriented along a vertical axis of the terminal housing 216. In embodiments, the first terminal housing end recess 224 may be oriented in an opposing direction to the second terminal housing end recess.

In embodiments, the cable housing recess 220 and the first terminal housing recess 226 may be aligned and/or coincide when the sockets 212 receives the plugs 206. For example, the cable housing leg recess 222 may be aligned and/or coincide with the first terminal housing leg recess 230 when the sockets 212 receives the plugs 206. By way of another example, the cable housing end recess 224 may be aligned and/or coincide with the first terminal housing end recess 232 when the sockets 212 receives the plugs 206. The coincidence of the cable housing recess 220 and the first terminal housing recess 226 may be considered a female part of the electrical connector 200.

In embodiments, the cable housing recess 220, the first terminal housing recess 226, and the second terminal housing recess 228 may receive the joining clip 100. The joining clips 100 may join or secure the plugs 206 to the sockets 212 by being received in the cable housing recess 220, the first terminal housing recess 226, and the second terminal housing recess 228. For example, the cable housing recess 220 and the first terminal housing recess 226 may receive the first leg 106 and the first end 102 of the joining clips 100. For instance, the cable housing leg recess 222 and the first terminal housing leg recess 230 may receive the first leg 106 of the joining clips 100. By way of another instance, the cable housing end recess 224 and the first terminal housing end recess 232 may receive the first end 102 of the joining clips 100. By way of another example, the second terminal housing recess 228 may receive the second leg 108 and the second end 104 of the joining clips 100. For instance, the second terminal housing leg recess 234 may receive the second leg 108. By way of another instance, the second terminal housing end recess may receive the second end 104 of the joining clips 100.

In embodiments, the U-bend 110 of the joining clips 100 may conform to an exterior face of the terminal housing 216 between the first terminal housing recess 226 and the second terminal housing recess 228 when the joining clips 100 are received in the cable housing recess 220, the first terminal housing recess 226, and the second terminal housing recess 228.

The joining clips 100 may be received by the cable housing recess 220, the first terminal housing recess 226, and the second terminal housing recess 228 by inserting the joining clip 100 into the cable housing recess 220, the first terminal housing recess 226, and the second terminal housing recess 228. The joining clips 100 may be resilient and may recover to an original shape, thereby exerting an inwards force on the cable housing 210 and terminal housing 216. The legs and ends of the joining clip 100 may cause the inwards force. The inward force on the cable housing 210 and terminal housing 216 clamps the plugs 206 to the sockets 212, thereby joining the junction box 202 to the busbar 204. Thus, the busbar 204 may be prevented from sliding in any direction with respect to the junction box 202. Clamping the plugs 206 to the sockets 212 also ensures the cable 208 contacts the terminal 214. In this regard, the electrical connector 200 may be a clamped connector or spring-type connector. The joining clips 100 may be supported by both the cable housing 210 and the terminal housing 216.

The joining clips 100 may be advantageous to provide ease-of-assembly when coupling and uncoupling the plugs 206 and sockets 212. The joining clips 100 may be coupled and/or uncoupled when external force is applied spreading the first leg 106 away from the second leg 108. It is contemplated that the joining clips 100 may maintain pressure between the plugs 206 and the sockets 212 with repeated assembly and disassembly of the joining clip 100. For example, the joining clips 100 may maintain pressure between the plugs 206 and the sockets 212 with repeated assembly and disassembly of the joining clips 100 for as long as the joining clips 100 are not plastically deformed.

In embodiments, the joining clips 100 may be electrically insulated from the cable 208 and the terminal 214 when the joining clip 100 join or secure the plugs 206 and the sockets 212. The cable housing 210 may electrically insulate the joining clips 100 from the cable 208. For example, the cable housing 210 may electrically insulate the first end 102 and the first leg 106 of the joining clips 100 from the cable 208. Similarly, the terminal housing 216 may electrically insulate the joining clips 100 from the terminal 214. For example, the terminal housing 216 may electrically insulate the second end 104 and the second leg 108 of the joining clips 100 from the terminal 214.

In embodiments, the junction box 202 and the busbar 204 may include an equal number of the plugs 206 and the sockets 212. In this regard, each of the plugs 206 corresponds to a respective of the sockets 212.

In embodiments, the junction box 202 may include three of the plugs 206 and the busbar 204 may include three of the sockets 212. The junction box 202 may include a first plug 206*a*, a second plug 206*b*, and a third plug 206*c*. The first plug 206*a*, second plug 206*b*, and third plug 206*c* may be aligned in a row. The second plug 206*b* may be disposed between the first plug 206*a* and the third plug 206*c*. The first plug 206*a*, second plug 206*b*, and third plug 206*c* may each include a respective of the cable 208 and cable housing 210. Similarly, the busbar 204 may include a first socket 212*a*, a second socket 212*b*, and a third socket 212*c*. The first socket 212*a*, second socket 212*b*, and third socket 212*c* may be aligned in a row. The second socket 212*b* may be disposed between the first socket 212*a* and the third socket 212*c*. The first socket 212*a*, second socket 212*b*, and third socket 212*c* may each include a respective of the terminal 214 and terminal housing 216. The first socket 212*a*, second socket 212*b*, and third socket 212*c* may receive the first plug 206*a*, second plug 206*b*, and third plug 206*c*, respectively.

In embodiments, the electrical connector 200 may be an electrical connector used in a three-phase electric machine. For example, the three of the plugs 206 and three of the sockets 212 may each carry a respective phase of the three-phases.

In embodiments, the electrical connector 200 may include two of the joining clips 100 to join or secure three of the plugs 206 and three of the sockets 212. The first plug 206*a*, second plug 206*b*, and third plug 206*c* may each include a respective of the cable housing 210 and cable 208. In embodiments, the cable housing 210 of the first plug 206*a* and third plug 206*c* may each define the cable housing recess 220. The cable housing recess 220 of the first plug 206*a* may be inverted to the cable housing recess 220 of the third plug 206*c*. The cable housing 210 of the second plug 206*b* may not define the cable housing recess 220. Similarly, the terminal housing 216 of the first socket 212*a* and third socket 212*c* may each define the first terminal housing recess 226 and the second terminal housing recess 228. The first terminal housing recess 226 of the first socket 212*a* may be inverted to the first terminal housing recess 226 of the third socket 212*c*. The second terminal housing recess 228 of the first socket 212*a* may be inverted to the second terminal housing recess 228 of the third socket 212*c*. The terminal housing 216 of the second socket 212*b* may not define the first terminal housing recess 226 and the second terminal housing recess 228.

In embodiments, a first joining clip 100*a* may join or secure the first plug 206*a* and the first socket 212*a* when the first plug 206*a* is received by the first socket 212*a*. For example, the first joining clip 100*a* may be received by the cable housing recess 220, the first terminal housing recess 226, and the second terminal housing recess 228 defined by the first plug 206*a* and the first socket 212*a*. Furthermore, a second joining clip 100*b* may join or secure the third plug 206*c* and the third socket 212*c* when the third plug 206*c* is received by the third socket 212*c*. For example, the second joining clip 100*b* may be received by the cable housing recess 220, the first terminal housing recess 226, and the second terminal housing recess 228 defined by the third plug 206*c* and the third socket 212*c*. The second plug 206*b* may be joined or secured to the second socket 212*b* by the first and second joining clip joining the first and third plugs to the first and third sockets, respectively. Thus, two of the joining clips 100 may join or secure three of the plugs 206 and three of the sockets 212.

Although the electrical connector 200 is described as including two of the joining clips 100 to join or secure three of the plugs 206 and three of the sockets 212, this is not intended as a limitation of the present disclosure. Similarly, although the electrical connector 200 is described as including three of the plugs 206 and three of the sockets 212, this is not intended as a limitation of the present disclosure. It is contemplated that the electrical connector 200 may include many variations on the number of the joining clips 100 used to join or secure varying numbers of the plugs 206 and the sockets 212. The benefits provided by the joining clips 100 may apply to such variable numbers of joining clips 100, plugs 206, and sockets 212.

In embodiments, the electrical connector 200 may be a high-voltage electrical connector. For example, the electrical connector 200 may be rated to carry over 1,000 VAC.

Although the electrical connector 200 is described as a high voltage electrical connector, this is not intended as a limitation of the present disclosure. In embodiments, the electrical connector 200 may be a low voltage electrical connector. The benefits provided by the joining clips 100 may apply to both low-voltage and high-voltage connectors.

In embodiments, the electrical connector 200 is used for an electrical machine. The electrical machine may include any electrical machine known in the art. It is contemplated that the electrical connector 200 may be used in any electrical machine with the junction box 202 and busbar 204. For example, the electrical machine may include an electric motor. The electric motor may be a three-phase electric motor. The electric motor may be used as a traction drive in a vehicle drive system. Thus, the electrical connector may be a high-voltage connector for a three-phase electrical machine.

Figure 3:
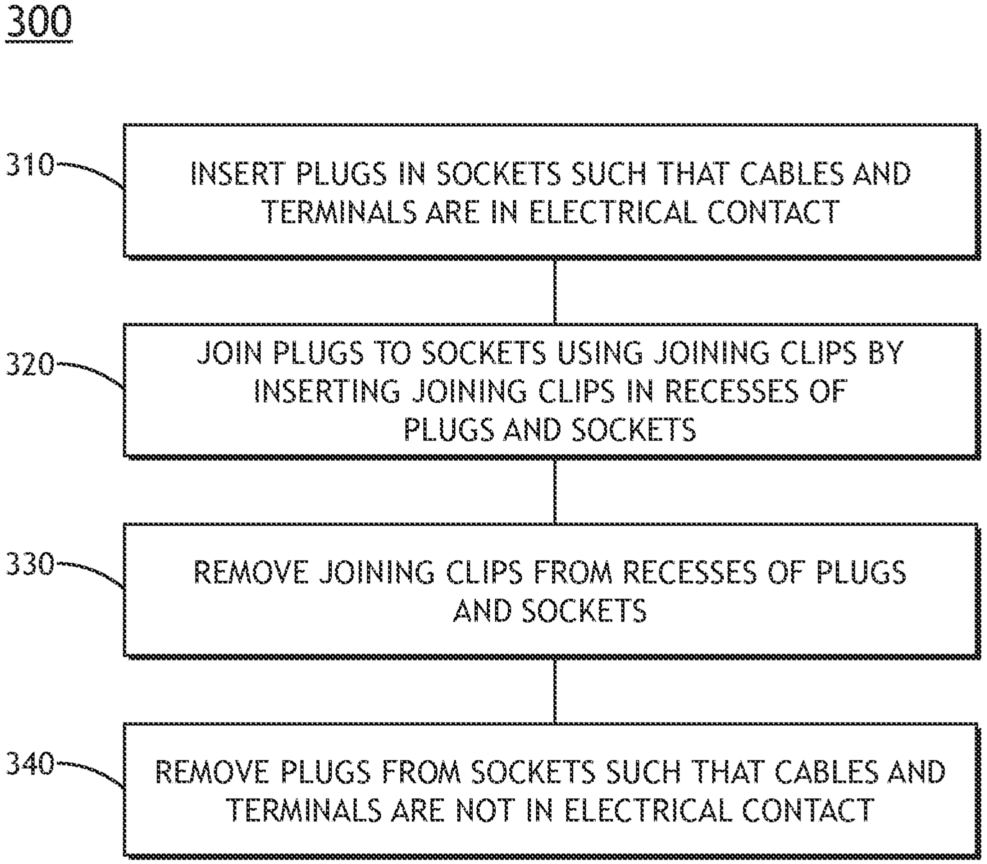
FIG. 3 depicts a flow diagram of a method of securing an electrical connection with the joining clip, in accordance with one or more embodiments of the present disclosure.

FIG. 3 illustrates a flow diagram of a method 300 of securing a plug and socket of an electrical connector of an electrical machine, in accordance with one or more embodiments of the present disclosure. The method 300 provides a means for electrically coupling and uncoupling the electrical connector 200. The embodiments and the enabling technology described previously herein in the context of the joining clip 100 and the electrical connector 200 should be interpreted to extend to the method 300. It is further recognized, however, that the method is not limited to the joining clip 100 and the electrical connector 200.

In a step 310, plugs of an electrical connector are inserted into corresponding sockets of the electrical connector such that cables and terminals are in electrical contact. For examples, as shown in FIGS. 2A-2E, the plugs 206 may be inserted in the sockets 212 such that the cables 208 and the terminals 214 are in electrical contact. For instance, the first plug 206*a*, second plug 206*b*, and the third plug 206*c* may be inserted in the first socket 212*a*, second socket 212*b*, and third socket 212*c*, respectively.

Figure 2A:
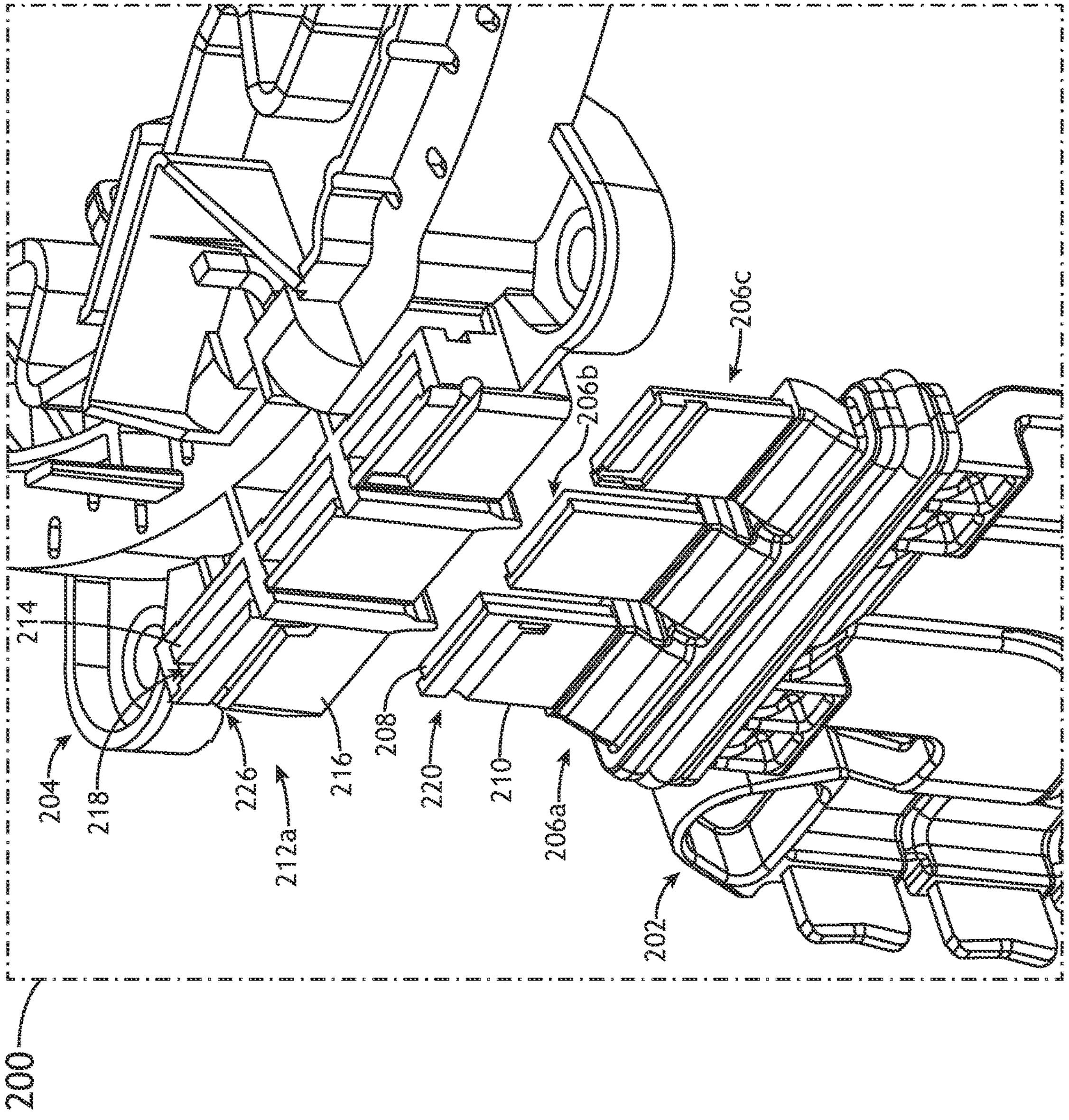
FIG. 2A depicts a perspective view of an electrical connection with ports which are removed from sockets, in accordance with one or more embodiments of the present disclosure.
Figure 2B:
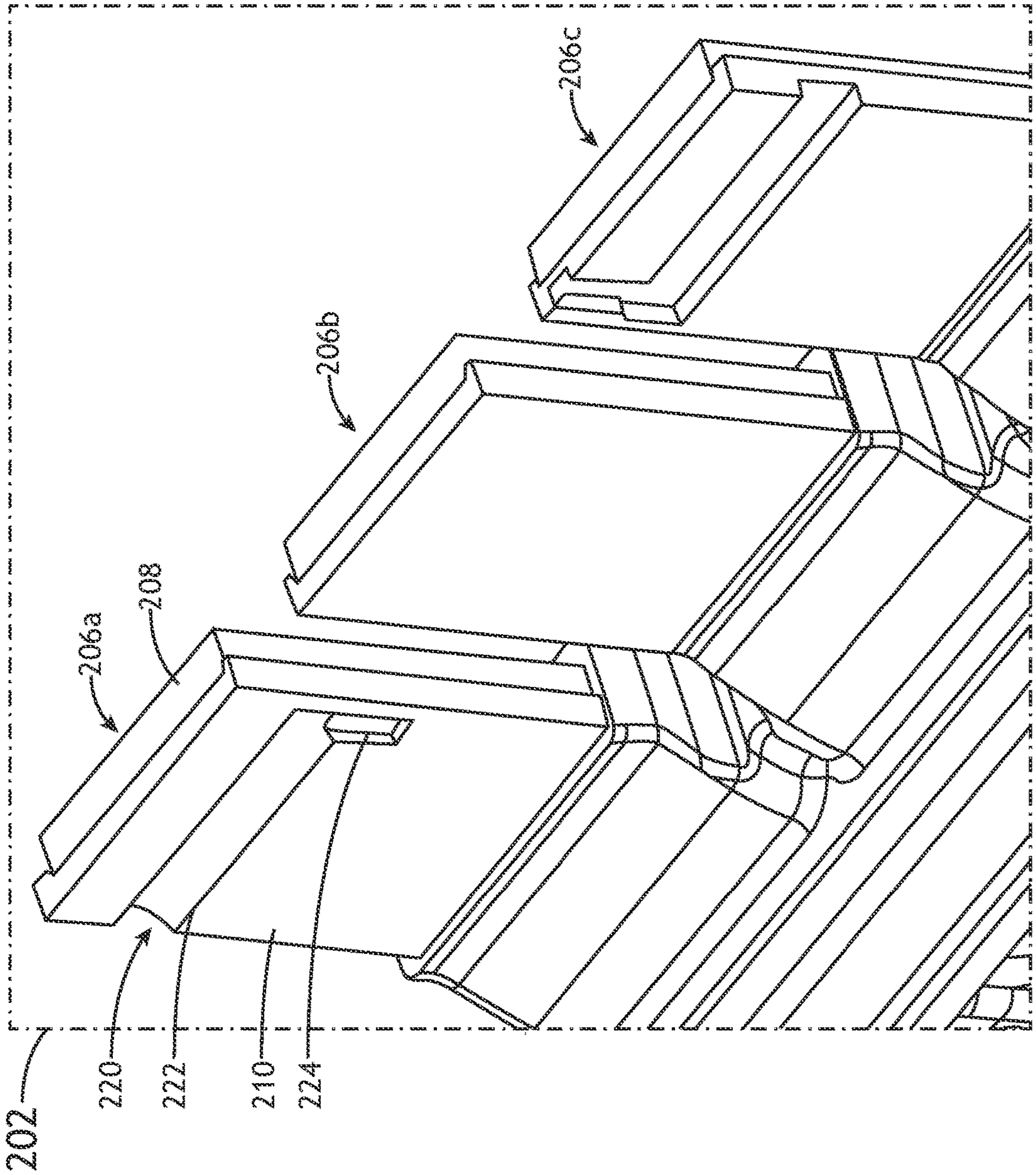
FIG. 2B depicts a partial perspective view of a junction box with a set of ports, in accordance with one or more embodiments of the present disclosure.
Figure 2C:
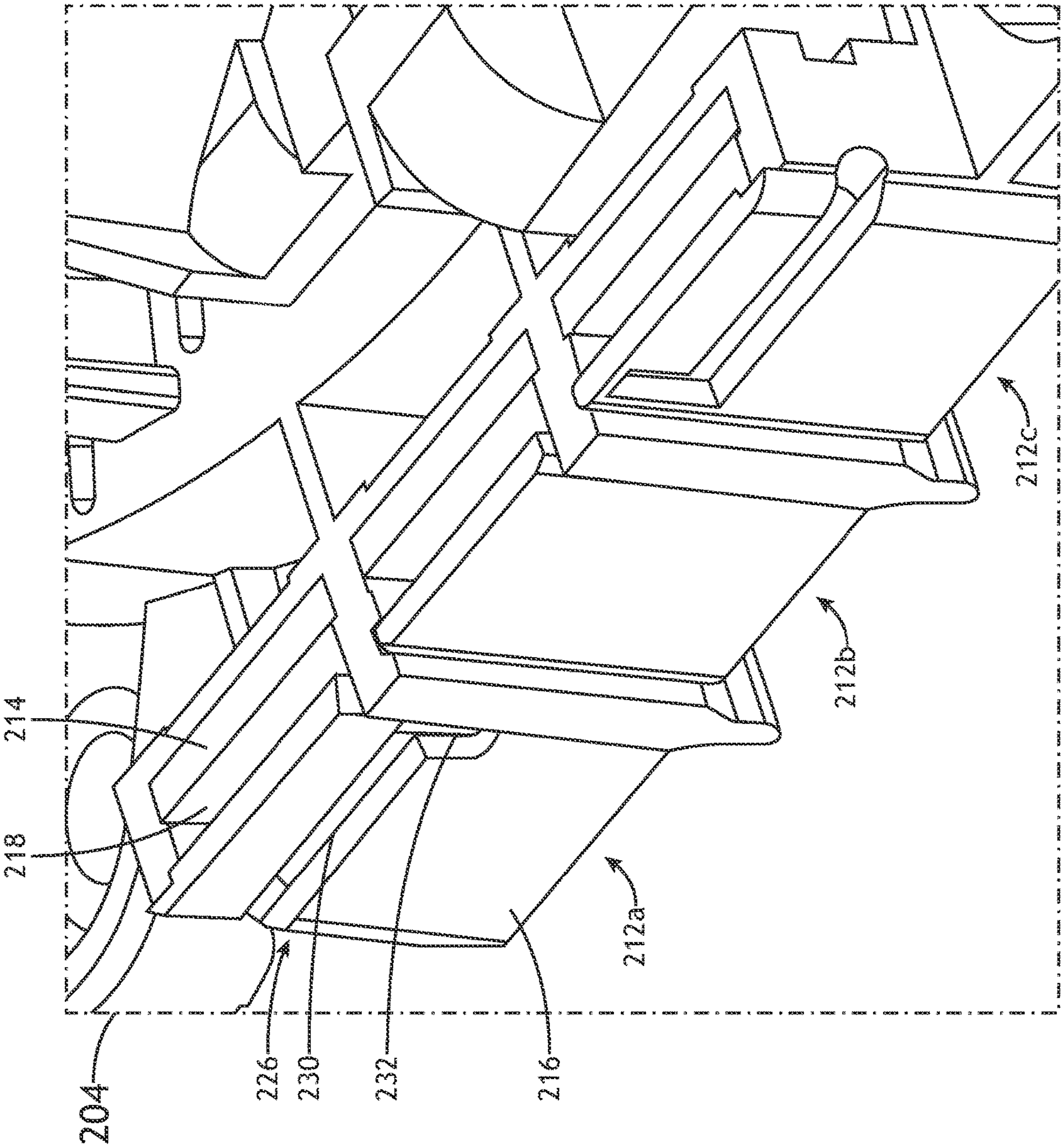
FIG. 2C depicts a partial perspective view of a busbar with a set of sockets, in accordance with one or more embodiments of the present disclosure.
Figure 2D:
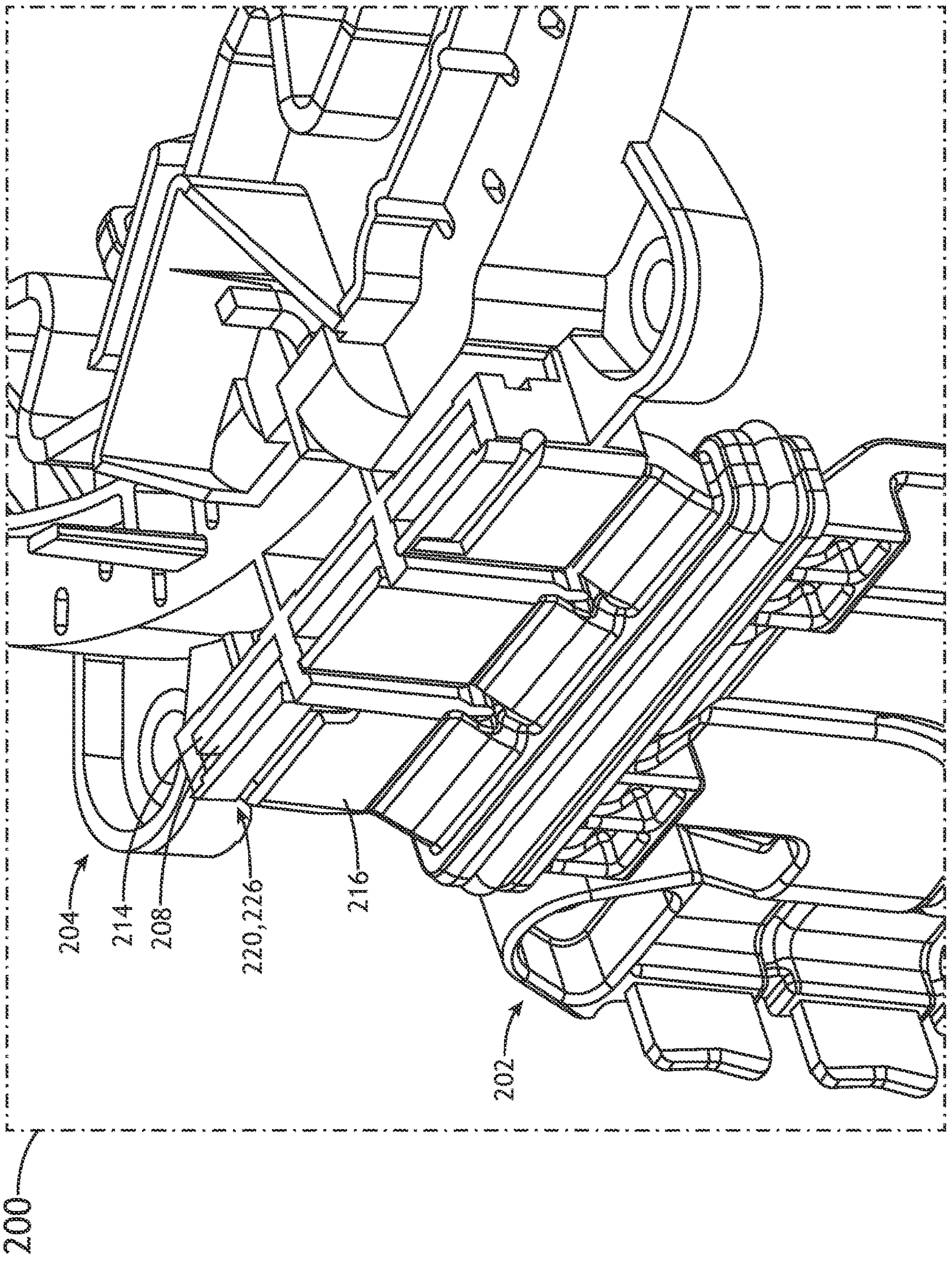
FIG. 2D depicts a perspective view of an electrical connection with ports which are received by sockets, in accordance with one or more embodiments of the present disclosure.
Figure 2E:
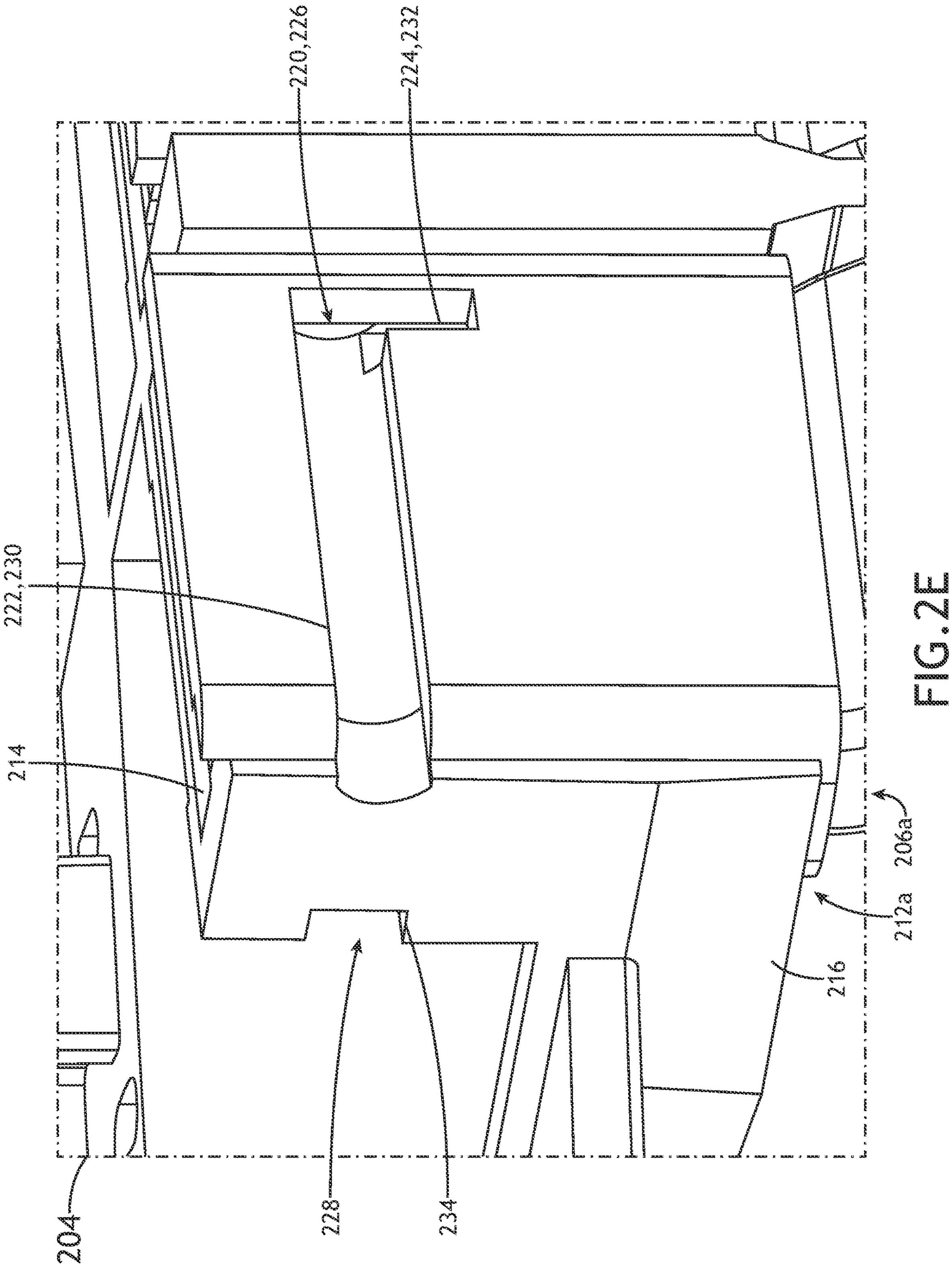
FIG. 2E depicts a partial perspective view of an electrical connection with ports which are received by sockets, in accordance with one or more embodiments of the present disclosure.
Figure 2F:
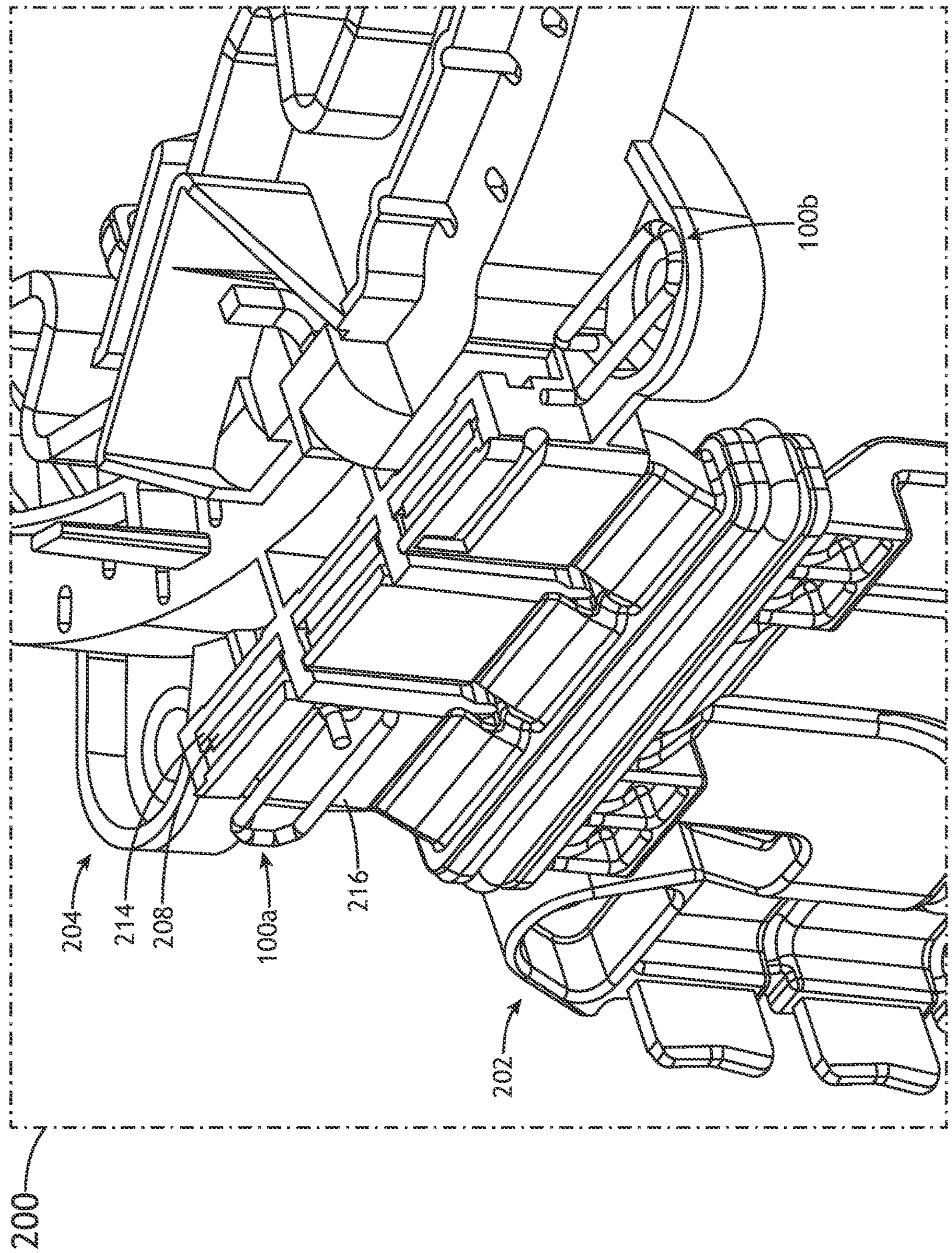
FIG. 2F depicts a perspective view of an electrical connection with ports which are received by sockets and a pair of joining clips before being coupled to the ports and sockets, in accordance with one or more embodiments of the present disclosure.
Figure 2G:
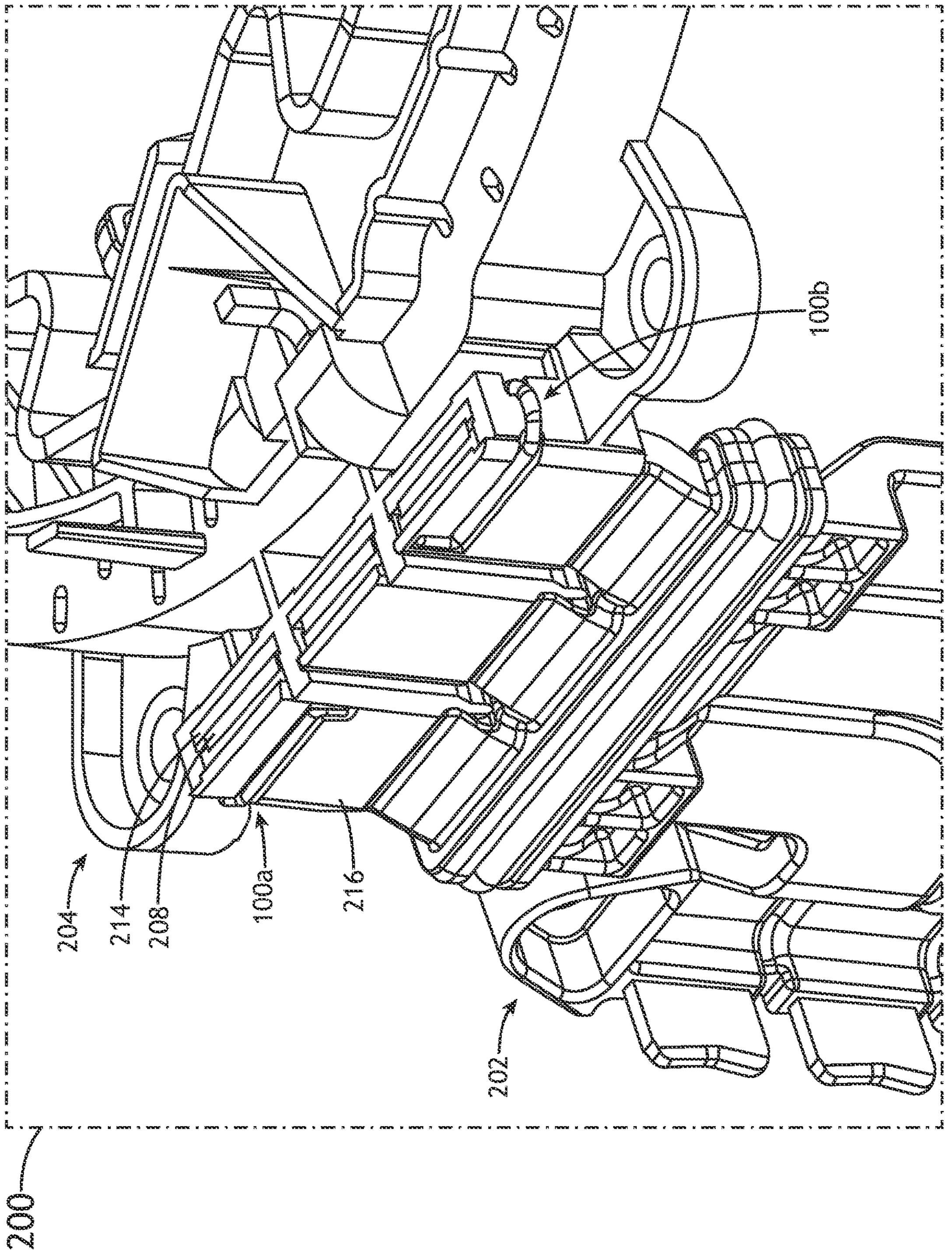
FIG. 2G depicts a perspective view of an electrical connection with ports which are received by sockets and a pair of joining clips coupled to the ports and sockets, in accordance with one or more embodiments of the present disclosure.
Figure 2H:
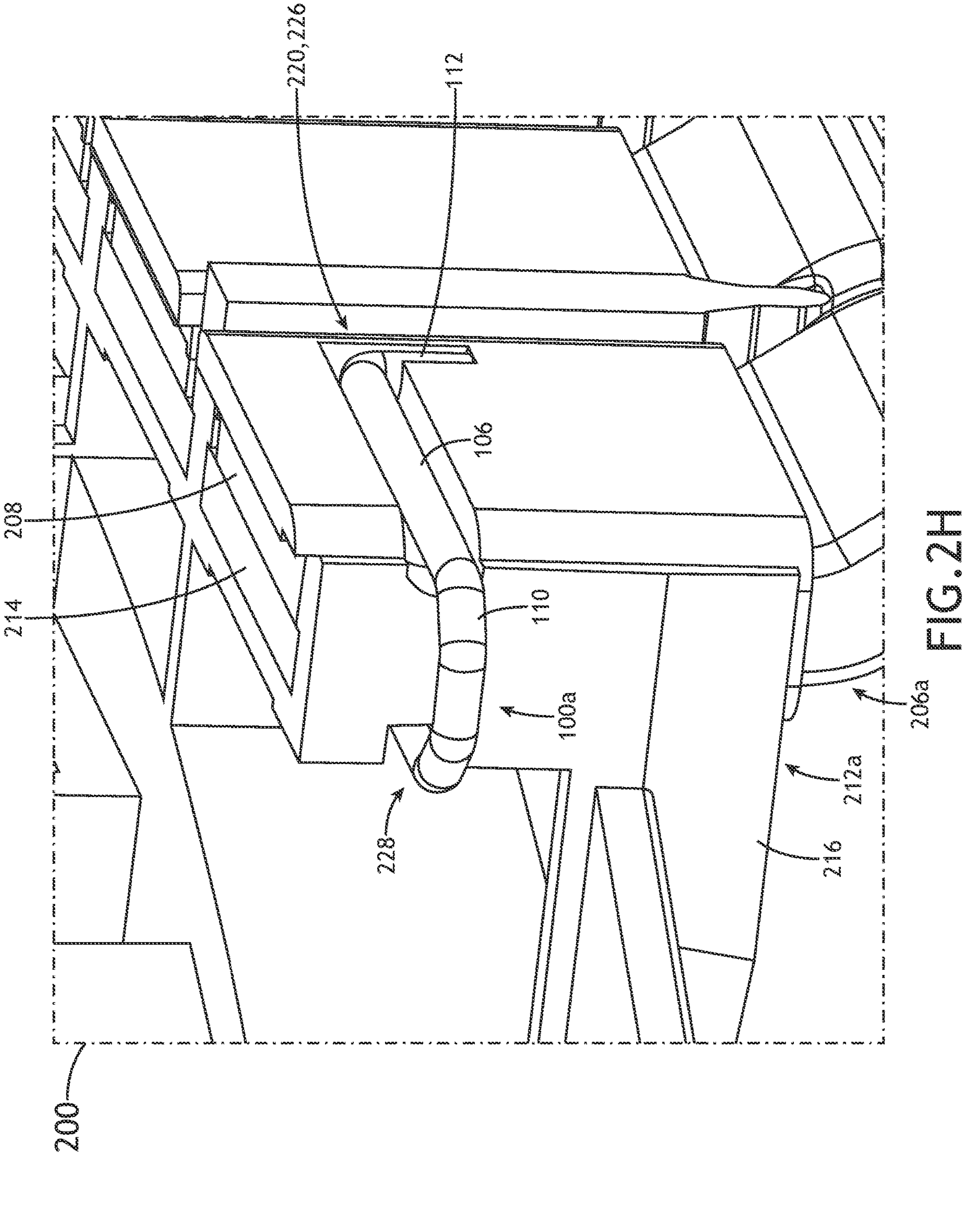
FIG. 2H depicts a partial perspective view of an electrical connection with ports which are received by sockets and a first joining clip coupled to a first of the ports and sockets, in accordance with one or more embodiments of the present disclosure.

In a step 320, the plugs of the electrical connector are joined or secured to sockets using joining clips. The joining clips are inserted in recesses of the plugs and sockets to join or secure the plugs to the sockets. For example, as shown in FIGS. 2F-2H, the plugs 206 may be joined or secured to the sockets 212 using joining clips 100. The first joining clip 100*a* may join or secure the first plug 206*a* to the first socket 212*a*. By way of another example, the second joining clip 100*b* may join or secure the third plug 206*c* to the third socket 212*c*. The joining clips 100 may join or secure the plugs 206 to the sockets 212 by being received in the cable housing recess 220, the first terminal housing recess 226, and the second terminal housing recess 228.

In a step 330, the joining clips are removed from the recesses of the plugs and sockets. Removing the joining clips from the recesses causes the plugs and sockets to be unsecured. For example, the joining clips 100 may be removed from the plugs 206 and the sockets 212. The first leg 106 and second leg 108 of the joining clips 100 may be spread apart thereby removing the joining clips 100 from the cable housing recess 220, the first terminal housing recess 226, and the second terminal housing recess 228. The joining clips 100 may then be slid away from the plugs 206 and the sockets 212 to be removed from the plugs 206 and the sockets 212.

In a step 340, the plugs are removed from the sockets such that the cables and terminals are not in electrical contact. For example, the plugs 206 may be removed from the sockets 212 such that the cables 208 and the terminals 214 are not in electrical contact. For instance, the first plug 206*a*, second plug 206*b*, and the third plug 206*c* may be removed from the first socket 212*a*, second socket 212*b*, and third socket 212*c*, respectively.

As used herein, directional terms such as "top," "bottom," "over," "under," "upper," "upward," "lower," "down," and "downward" are intended to provide relative positions for purposes of description and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 joining clips
100*a* first joining clip
100*b* second joining clip
102 first end
104 second end
106 first leg
108 second leg
110 U-bend
112 first L-bend
114 second L-bend
200 electrical connector
202 junction box
204 busbar
206 plugs
206*a* first plug
206*b* second plug
206*c* third plug
208 cable
210 cable housing
212 sockets
212*a* first socket
212*b* second socket
212*c* third socket
214 terminal
216 terminal housing
218 cavity
220 cable housing recess
222 cable housing leg recess
224 cable housing end recess
226 first terminal housing recess
228 second terminal housing recess
230 first terminal housing leg recess
232 first terminal housing end recess
234 second terminal housing leg recess

What is claimed:

1. An electrical connector of an electrical machine comprising:

a first joining clip comprising:

a first end and a second end, wherein the first end is oriented in an opposing direction to the second end;

a first leg and a second leg;

a U-bend, wherein the U-bend joins the first leg to the second leg; and a first L-bend and a second L-bend, wherein the first L-bend joins the first end to the first leg, wherein the second L-bend joins the second end to the second leg;

a first plug, the first plug comprising a cable and a cable housing, wherein the cable housing is rigidly coupled to and supports the cable; and a first socket, the first socket comprising a terminal and a terminal housing, wherein the terminal housing is rigidly coupled to and supports the terminal, wherein the first plug is configured for insertion in the first socket such that the cable and the terminal are in electrical contact, wherein the first joining clip is configured to secure the first plug to the first socket when the first plug is inserted in the first socket.

2. The electrical connector of claim 1, wherein the cable and the terminal are each a flat metal plate.

3. The electrical connector of claim 1, wherein the cable housing defines a cable housing recess, wherein the terminal housing defines a first terminal housing recess and a second terminal housing recess, wherein the first joining clip is configured to secure the first plug to the first socket by being received in the cable housing recess, the first terminal housing recess, and the second terminal housing recess.

4. The electrical connector of claim 3, wherein the cable housing recess and the first terminal housing recess are aligned when the first socket receives the first plug, wherein the cable housing recess and the first terminal housing recess are configured to receive the first leg and the first end of the first joining clip.

5. The electrical connector of claim 3, wherein the second terminal housing recess is configured to receive the second leg and the second end of the first joining clip.

6. The electrical connector of claim 3, wherein the U-bend conforms to an exterior face of the terminal housing between the first terminal housing recess and the second terminal housing recess when the first joining clip is received in the cable housing recess, the first terminal housing recess, and the second terminal housing recess.

7. The electrical connector of claim 1, wherein the first joining clip is electrically insulated from the cable and the terminal when the first joining clip secures the first plug and the first socket.

8. The electrical connector of claim 1, comprising a junction box and a busbar, wherein the junction box comprises a plurality of plugs, wherein the first plug is a first of the plurality of plugs, wherein the busbar comprises a plurality of sockets; wherein the first socket is a first of the plurality of sockets.

9. The electrical connector of claim 8, wherein the plurality of plugs comprises the first plug, a second plug, and a third plug, wherein the first plug, the second plug, and the third plug are aligned in a row; wherein the plurality of sockets comprises the first socket, a second socket, and a third socket, wherein the first socket, the second socket, and the third socket are aligned in a row, wherein the second socket is configured to receive the second plug; wherein the third socket is configured to receive the third plug.

10. The electrical connector of claim 9, further comprising a second joining clip, wherein the second joining clip is configured to secure the third plug and the third socket when the third plug is received by the third socket.

11. The electrical connector of claim 10, wherein the electrical connector is a high voltage electrical connector.

12. A method of securing a plug and socket of an electrical connector of an electrical machine comprising:

inserting a first plug in a first socket such that a cable and a terminal are in electrical contact, wherein the first plug comprises the cable and a cable housing, wherein the cable housing is rigidly coupled to and supports the cable, wherein the first socket comprises the terminal and a terminal housing; and securing the first plug to the first socket using a first joining clip, wherein the first joining clip comprises a first end, a second end, a first leg, a second leg, a U-bend, a first L-bend, and a second L-bend, wherein the first end is oriented in an opposing direction to the second end, wherein the U-bend joins the first leg to the second leg, wherein the first L-bend joins the first end to the first leg, wherein the second L-bend joins the second end to the second leg.

13. The electrical connector of claim 1, wherein the first joining clip comprises a wire, wherein the first end and the second end are disposed at opposing ends of the wire.

14. The electrical connector of claim 1, wherein the first end, the second end, the first leg, and the second leg are straight.

15. The electrical connector of claim 14, wherein the first leg and the second leg each include a same length, wherein the first end and the second end are co-planar.

16. The electrical connector of claim 14, wherein the first leg, the second leg, and the U-bend are co-planar.

17. The electrical connector of claim 14, wherein the first leg and the second leg are longer than the first end and the second end.

18. The electrical connector of claim 1, wherein the first end and the second end are joined at approximately 90-degrees with the first leg and the second leg respectively, wherein the first leg is joined at approximately 180-degrees with the second leg.

19. The electrical connector of claim 1, wherein the first end and the second end are oriented in opposing directions relative to each other, wherein the first joining clip has rotational symmetry about a longitudinal axis.

20. The electrical connector of claim 1, wherein the first end and the second end are coplanar and not colinear with each other.

* * * * *